T. ARNDT.
Car Coupling.
No. 51,535.
Patented Dec. 19, 1865.
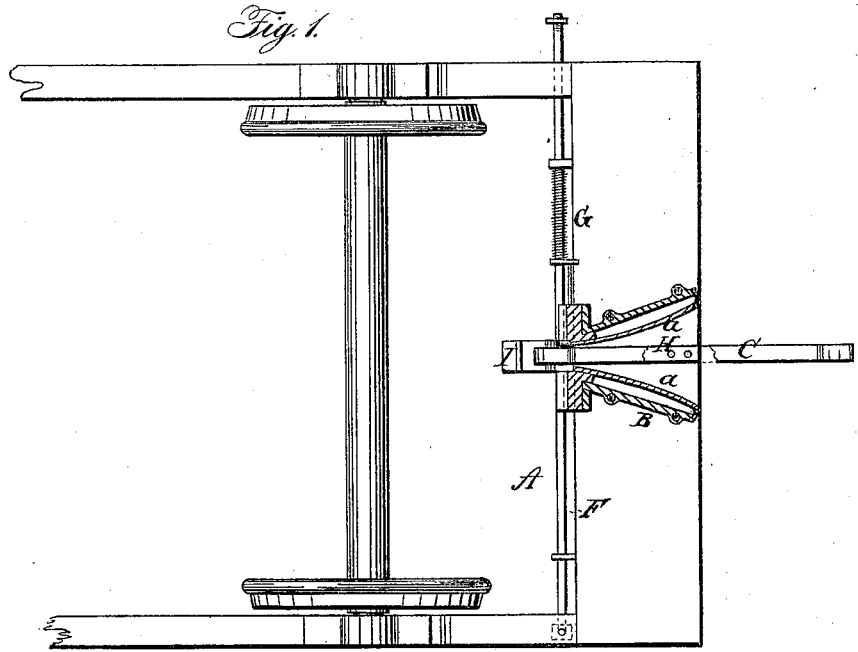
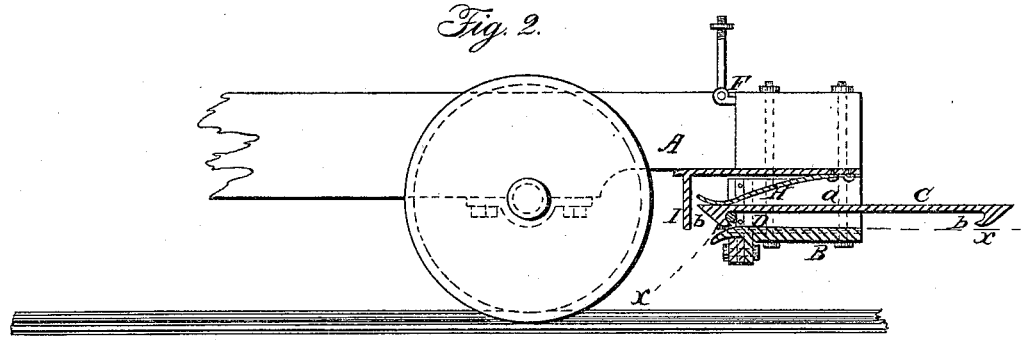
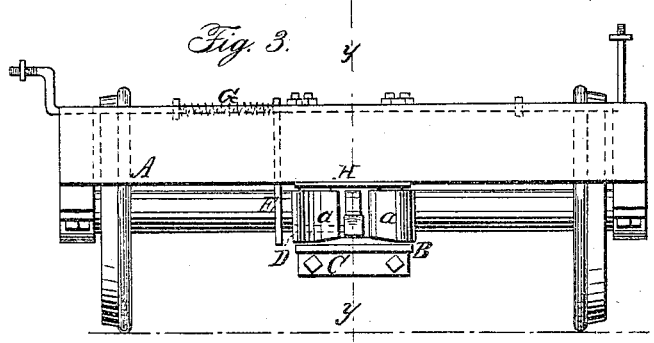
Witnesses:
Inventor:

UNITED STATES PATENT OFFICE.

THEOPHILUS ARNDT, OF MOUNT JOY, PENNSYLVANIA.

IMPROVED CAR-COUPLING.

Specification forming part of Letters Patent No. 51,535, dated December 19, 1865.

*To all whom it may concern:*

Be it known that I, THEOPHILUS ARNDT, of Mount Joy, in the county of Lancaster and State of Pennsylvania, have invented a new and Improved Car-Coupling; and I do hereby declare that the following is a full, clear, and exact description thereof, which will enable others skilled in the art to make and use the same, reference being had to the accompanying drawings, forming part of this specification, in which—

Figure 1 is a horizontal section of my invention, looking upward, x x, Fig. 2, indicating the line of section; Fig. 2, a longitudinal vertical section of the same, taken in the line y y, Fig. 3. Fig. 3 is a front view of the same.

Similar letters of reference indicate like parts.

This invention relates to a new and improved car-coupling of that class which is termed "self-acting;" and it consists in the employment or use of a hook, link, or shackle in connection with a sliding bolt and a draw-head provided with yielding sides, all being arranged as hereinafter fully shown and described, whereby the link or shackle of the draw-head of one car is readily allowed to connect itself with the draw-head of an adjoining car, and the link or shackle readily disconnected when necessary or desired.

A represents a car-truck, and B a draw-head attached to one end of the same. This draw-head is made of flaring form, and it has elastic or yielding plates *a a* fitted within it at each side, which have a flaring position corresponding with the flaring sides of the draw-head.

The rear end of the draw-head is open, but, on account of the flaring position of the sides of the draw-head, the rear opening is made narrower than the front, as clearly shown in Fig. 1, but is sufficiently wide to admit of the link or shackle passing through it.

The link or shackle C is provided with a hook, *b*, at each end, as shown clearly in Fig. 2, and through the rear part of the draw-head a rod, D, passes transversely and is allowed to slide freely in the draw-head, said rod being attached to a pendent bar, E, which is connected to a sliding rod, F, fitted transversely on the car-truck. On the rod F a spiral spring, G, is placed, and this spring has a tendency to keep the rod D across the opening at the inner end of the draw-head.

When the link or shackle is forced into the draw-head its hook catches over the rod D, a spring, H, in the draw-head pressing the link or shackle down on said rod, as shown clearly in Fig. 2.

At the rear of the draw-head there is a pendent bar, I, to serve as a stop for the link or shackle.

In order to disconnect the link or shackle, the operator simply moves or slides the rod F, which draws the rod D to one side and liberates the link or shackle C.

The yielding plates *a a* admit of the link or shackle entering the draw-head freely without jars or concussions, and, if necessary or desired, a yielding bottom plate may be fitted in the draw-head.

Having thus described my invention, I claim as new and desire to secure by Letters Patent—

1. The link or shackle C, provided with hooks *b* at its ends, in combination with the sliding rod D and the spring H, arranged within the draw-head, substantially as and for the purpose set forth.

2. The elastic or yielding plates *a a* in the draw-head, when used in combination with the sliding rod D and spring H, substantially as and for the purpose set forth.

The above specification of my invention signed by me this 16th day of September, 1865.

THEOPHILUS ARNDT.

Witnesses:
CYRUS SCHWANGER,
JACOB F. HERSHEY.